United States Patent [19]

Hammer et al.

[11] Patent Number: 5,501,886
[45] Date of Patent: Mar. 26, 1996

[54] CELLULOSE HYDRATE-BASED FLAT OR TUBULAR FILM

[75] Inventors: Klaus-Dieter Hammer, Mainz; Manfred Siebrecht, Wiesbaden; Leo Mans, Saulheim; Theo Krams; Hermann Winter, both of Wiesbaden, all of Germany

[73] Assignee: Hoechst Aktiengesellschaft, Frankfurt am Main, Germany

[21] Appl. No.: 277,038

[22] Filed: Jul. 19, 1994

[30] Foreign Application Priority Data

Jul. 19, 1993 [DE] Germany .......................... 43 24 169.7
Oct. 11, 1993 [DE] Germany .......................... 43 34 561.1

[51] Int. Cl.$^6$ .................................................. F16L 11/08
[52] U.S. Cl. .................... 428/34.8; 428/532; 138/118.1; 426/105; 426/129; 426/277; 206/802
[58] Field of Search ................................. 428/34.8, 532; 138/118.1; 206/802; 426/105, 129, 277; 229/DIG. 10

[56] References Cited

U.S. PATENT DOCUMENTS

| 2,988,451 | 6/1961 | Zahn .......................................... 99/176 |
| 3,447,939 | 6/1969 | Johnson ................................... 106/135 |
| 4,163,463 | 8/1979 | O'Brien, Jr. ........................... 138/118.1 |
| 5,096,754 | 3/1992 | Hammer et al. ....................... 428/34.8 |

FOREIGN PATENT DOCUMENTS

0460348 12/1991 European Pat. Off. .
1546629 11/1968 France .
2600203 7/1976 Germany .
3409746 6/1985 Germany .

*Primary Examiner*—Charles R. Nold
*Attorney, Agent, or Firm*—Foley & Lardner

[57] ABSTRACT

A cellulose hydrate-based flat or tubular film which is useful as a food casing, particularly preferably as a sausage casing. In addition to cellulose hydrate, it contains a homopolymer having units of N-vinylpyrrolidone, N-vinylpyridone or N-vinylcaprolactam and/or a copolymer containing these units and additionally units of the formulae II and/or III:

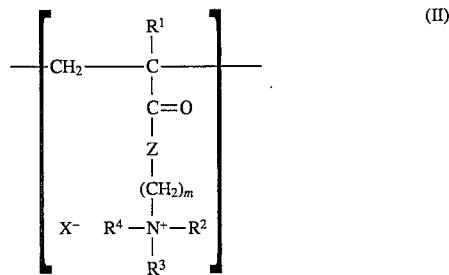

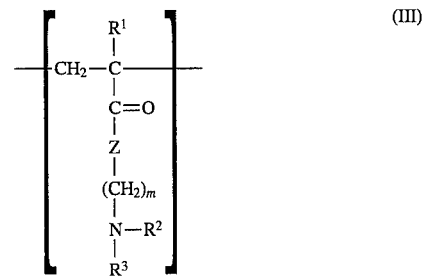

18 Claims, No Drawings

5,501,886

CELLULOSE HYDRATE-BASED FLAT OR TUBULAR FILM

BACKGROUND OF THE INVENTION

1. Field of the Invention

The present invention relates to a cellulose hydrate-based flat or tubular film, its use as a food casing, preferably as a synthetic sausage casing, and a process for the production of the film and casing.

2. Description of Related Art

Cellulose hydrate-based flat, i.e., weblike, sheetlike or tubular films have long been known and are conventionally produced by the viscose process. In the viscose process an alkaline solution of cellulose xanthogenate, generally termed viscose solution, is extruded through a ring die or slot die and coagulated with acidic liquid as cellulose hydrate gel and regenerated to form cellulose hydrate. By means of the viscose composition and incorporation of additives, the properties of the tubular or flat body of the regenerated cellulose can be varied. The unreinforced cellulose hydrate films are also termed cellulose films and are known under the trademark Cellophane®. The films are also used as synthetic sausage casing, generally as so-called "small" casings.

In the production of fiber-reinforced bodies, a tubular or weblike fibrous material is coated on one or both surfaces with viscose solution and impregnated and then treated in an appropriate manner with coagulation and regeneration liquid. These fiber-reinforced casings are principally used for the production of naturally ripened and mold-ripened long-keeping sausage. It is also known to bend weblike cellulose films after their production to form a tube and to join the overlapping edges together, with formation of a longitudinal seam, or to produce the tubular casing seamlessly by extrusion of the viscose through a ring die.

Synthetic sausage casings based on cellulose perform important functions in the production, ripening and storage of the sausage product. They must be pliable and sufficiently extensible in order to be able to fill them, without any problems, with sausage meat to the desired caliber even after relatively long storage periods.

It is known to improve these properties by addition of secondary plasticizers such as glycerol. Since these plasticizers are not chemically bound to the cellulose hydrate but are only bound by intermolecular forces, they are dissolved out when the casing is moistened or when the sausage is simmered or boiled. The consequence is a particularly high brittleness of the plasticizer-free, dried cellulose casing after processing. This phenomenon is due to a crystallization proceeding in the cellulose material, the formation of hydrogen bonds between the individual cellulose molecules in the cellulose structure, and thus the closer proximity and spatial fixation of the molecules. As a result of this structural change, the casing becomes particularly impact-sensitive and frequently tears over the entire length on the first incision. All known cellulose hydrate casings, because of the described tendency to embrittling, are in need of improvement with respect to their pliability and extensibility.

In addition, cellulose hydrate casings must have a water permeation as low as possible. The permeation is decisive for the ripening behavior and mold growth in naturally ripened and mold-ripened long-keeping sausage. The uniform ripening of these sausage types demands a very slow release of water from the sausage mass during the first days. Therefore, when conventional fiber-reinforced cellulose casings are used, a very high and constant relative air humidity of the surroundings must prevail, for which reason the ripening of raw sausage has previously been carried out in ripening chambers in which the relative air humidity is controlled within narrow ranges.

An insufficient or varying moisture content of the ambient air leads to so-called dry rims on the outer periphery of the sausage. This particularly occurs when the casing material has an excessive permeation and the sausage mass, as a result, dries too quickly at the outer surface in the first days of ripening. The dried outer periphery of the sausage, the so-called dry edge, prevents the further exit of moisture from the interior of the sausage, so that it is still moist after the conventional ripening time. Moreover, the sausage casing no longer adheres sufficiently firmly to the dry edge, so that undesirable gaps develop between the sausage mass and the casing, and folds develop in the casing.

Furthermore, the mechanical strength and toughness of the cellulose hydrate casings are of particular importance. When the casings are being filled, in particular at high filling rates, there must be no breakdowns due to burst casings. These disadvantages occur, for example, in the case of the collagen fiber casings. Although collagen fiber casings are outstanding with respect to their permeation, they have completely inadequate mechanical strength. Similarly, alginate-modified casings which are not fiber-reinforced are not usable, because of their deficient mechanical strength, although the addition of alginate has very advantageous effects in the case of fiber-reinforced casings.

In addition, sausage manufacturers expect that cellulose hydrate casings show a consistency of caliber, i.e., that sausages which have been produced from the same casing material all have the same caliber within narrow ranges. Caliber is defined as the inside diameter of the casing. In this regard, casings are in need of improvement, especially casings which are not fiber reinforced.

A further quality characteristic of cellulose hydrate casings is their moisture balance. On the one hand, the material should have a high water imbibition, i.e., should absorb amounts of water as large as possible. On the other hand, at the same time, delayed water release is desired. The capacity for water absorption and release is not equivalent to, or correlated with, the permeation. The permeation is a measure of the water permeability of the casing, while the moisture balance characterizes the water absorption capacity and water binding capacity of the casing. A good moisture balance ensures a problem-free drying process, in which no brittleness or overdrying of the casing occurs.

SUMMARY OF THE INVENTION

One object of the present invention is to avoid the above-described disadvantages of known cellulose hydrate films. In particular, the cellulose hydrate films are to show improved, i.e., lower, permeation, in particular in the case of fiber-reinforced films, and an improved moisture balance, i.e., a high water absorption capacity and low water release, in comparison to conventional known cellulose hydrate films. Another object is for the cellulose hydrate films to have at the same time a good pliability and extensibility and good mechanical strengths and toughness, particularly in the case of films which are not fiber reinforced. In addition, the films should not embrittle even after relatively long storage periods. Furthermore, good constancy of caliber is very desirable in the case of tubular films.

Another object of the present invention is to provide a cellulose hydrate casing having the above-described improved properties which is useful as sausage casing.

Another object of the present invention is to provide a method for producing the cellulose hydrate film in a tubular or flat configuration. Still another object of the present invention is to provide a sausage product that is wrapped by the cellulose hydrate casing.

In accomplishing the foregoing objectives, there has been provided according to one aspect of the present invention a cellulose hydrate film, which is flat or tubular. The cellulose hydrate film contains cellulose hydrate and a polymer. The polymer can be a homopolymer of the formula I, and/or a copolymer of repeating units of the formulae I and II and/or I and III. The formulae I-III are shown below, where:

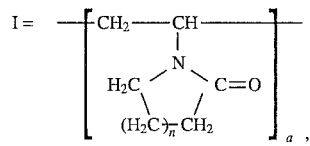

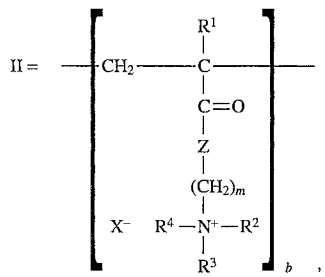

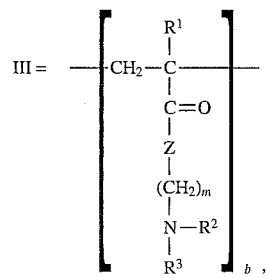

in which:
n=1, 2, or 3;
m=2, 3, 4, 5 or 6;
a=in the copolymers is about 20 to 80 mol %,
b=about 80 to 20 mol %, each based on a+b=100 mol %;
$R^1$ is H or a $(C_1-C_6)$-alkyl radical,
$R^2$ to $R^4$ are identical or different and are $(C_1-C_6)$-alkyl radicals;
Z=O or N-$R^5$, in which $R^5$ =H or $C_1-C_6$-alkyl radicals; and
$X^-$ =$Cl^-$, $Br^-$, $I^-$, $F^-$, $1/2SO_4^{2-}$, $HSO_4^-$, $(C_1-C_6)$-alkyl-$SO_2O$ or $(C_1-C_6)$alkyl-$SO_2$-O.

It is to be understood that the definition of the R's Z, X, n, and m can vary in the repeating units of the polymers.

In a preferred embodiment, the film is reinforced with fibers. In another preferred embodiment, the film is not reinforced with fibers.

The present invention also provides a food product casing which includes the film of the present invention shaped in the configuration of a food casing. Another aspect of the present invention provides a sausage product. The sausage product includes the film shaped in the configuration of the of a sausage casing and filled with a sausage product.

Yet another aspect of the present invention provides a process for making the flat or tubular film of the present invention. The process includes the steps of: (i) preparing a solution of an alkaline viscose solution which comprises an aqueous solution of said polymers; (ii) extruding an alkaline viscose solution into the shape of a film; and (iii) coagulating said viscose film by an acidic precipitation liquid to form said film.

In another embodiment, the process provides a fiber reinforced flat or tubular film. The process includes the steps of: (i) preparing a solution of an alkaline viscose solution which comprises an aqueous solution of said polymers; (ii) coating and impregnating said alkaline viscose solution onto a fiber web; (iii) coagulating said viscose solution coated and impregnated onto said fiber web by an acidic precipitation liquid to form said fiber reinforced film.

Further objects, features and advantages of the present invention will become apparent from the detailed description of preferred embodiments which follows.

DETAILED DESCRIPTION OF THE PREFERRED EMBODIMENTS

The present invention comprises a cellulose hydrate-based flat or tubular film, which additionally contains:
a) a homopolymer of repeating units of the formula I and/or
b) at least one copolymer of repeating units of the formulae I and II and/or I and III

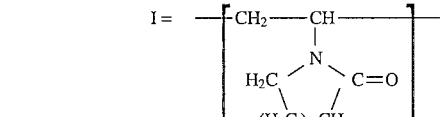

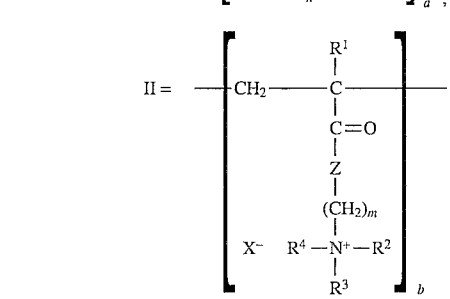

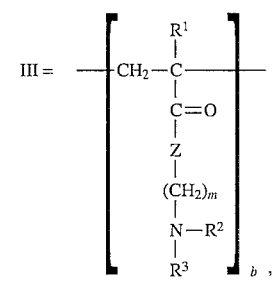

in which
n=1, 2 or 3,
m=2, 3, 4, 5 or 6,
a=in the copolymers is about 20 to 80 mol %,
b=about 80 to 20 mol % and
a+b=100 mol %,
$R^1$ is H or a $(C_1-C_6)$-alkyl radical,
$R^2$ to $R^4$ are identical or different and are $(C_1-C_6)$-alkyl radicals, $Z=O$ or $N-R^5$, in which $R^5 = H$ or $(C_1-C_6)$-alkyl radicals and $X^- = Cl^-, Br^-, I^-, F^-, 1/2SO_4^{2-}, HSO_4^-, (C_1-C_6)$-alkyl-$O$-$SO_2$-$O^-$, $(C_1-C_6)$-alkyl-$SO_2$-$O^-$.

The film is generally a substrate in a web or sheet form. Its thickness is relatively low in comparison to its length and width. It is particularly suitable as a packaging film, e.g., for food. It is also preferably tubular and comprises a curved web, the longitudinal axial edges of which are joined together by a longitudinal axial seam. The tubular film can also be fabricated seamlessly. It can optionally be used with a fiber reinforcement as a synthetic sausage casing in the sausage manufacture.

While any homopolymer of the formula I can be used, the homopolymer is preferably polyvinylpyrrolidone, i.e., a homopolymer with repeating units of the formula I, in which $n=1$.

The copolymers can be any copolymer of only I and one or both of II and III. The preferred copolymers are polymers of two monomer types A (corresponds to formula I) and B (corresponds to formula II or III). Monomer A is preferably N-vinylpyrrolidone and/or N-vinylpyridone and/or N-vinylcaprolactam. Monomer B includes esters of unsaturated carboxylic acids of the formula:

$$R^6\text{-CO-O-}R^7 \qquad (IV)$$

in which $R^6$ is a monounsaturated branched or unbranched alkyl radical of the formula $C_nH_{2n-1}$, where $n=2$, 3 or 4, and $R^7$ is a trialkyl-substituted ammonium radical of the formula:

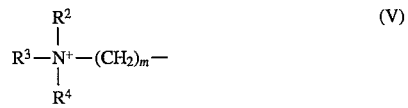

or an alkyl-substituted amine radical of the formula:

in which $R^2$, $R^3$, $R^4$ and m each have the meaning given above, or unsaturated carboxylic amides of the formula:

in which $R^5$, $R^6$ and $R^7$ have the above meaning.

While monomers B can be any monomer of the above formulae, preferred monomers B are unsaturated carboxylic acids of formula IV and unsaturated carboxylic amides of formula VII, in which $R^6$ is in each case vinyl, 1-methylvinyl, propenyl or allyl.

Thus, the copolymers preferred are those compounds of the formulae I and II and/or I and III, in which n=1, m=2, 3 or 4, a=in the copolymers is about 30 to 70 mol % and b=about 70 to 30 mol % and a+b=100 mol %, Z=O or NH, $X^- = HSO_4^-$, $(C_1-C_6)$-alkyl-$O$-$SO_2$-$O^-$ or $(C_1-C_6)$-alkyl-$SO_2$-$O^-$ and $R^1$ is H or $CH_3$, $R^2$ to $R^4$ are identical or different and are $CH_3$ or $C_2H_5$.

The copolymers are prepared by polymerization of the above-described monomers A with the above-described monomers B by known methods. Copolymers of this type are sold under the designation Gafquat® as aqueous solutions by GAF Corp.

While any mean molecular weight $M_w$ can be used, the homo- and copolymers generally have a mean molecular weight $M_w$ of about 50,000 to 2,000,000, preferably of about 100,000 to 1,500,000, more preferably of about 500,000 to 1,500,000. The pH of the polymer solutions in aqueous solutions is generally about 4 to 8. Aqueous solutions generally have a viscosity of about 10,000 to 100,000 mPas (at 25° C. Brookfield RVF or RVT, 20 RPM).

Copolymers of N-vinylpyrrolidone and ethyl-(2-methacryloyloxyethyl)dimethylammonium ethyl sulfate and quaternized copolymers of N-vinylpyrrolidone and (3-methacryloylaminopropyl)trimethylammonium chloride have proven to be very particularly advantageous.

The homo- and/or copolymers are generally mixed with the alkaline viscose solution in the spinning tank or before the spinning die. The solution is then extruded in a conventional manner through a spinning die, precipitated and regenerated. The solution is still homogeneous even at a high concentration of homo- or copolymer, in which case surprisingly, the precipitation and regeneration of the cellulose hydrate are not impaired.

The proportion of the above-mentioned homo- and/or copolymer in the cellulose hydrate casing can be varied within broad ranges. The homo- and/or copolymer is present in an amount effective to provide low water permeation and provide a good moisture balance. The homo- and/or copolymer is also present in an amount effective to provide good pliability and extensibility and good mechanical strength and toughness.

Generally, in non-fiber-reinforced casings, it is about 0.1 to 60% by weight, preferably about 0.5 to 30% by weight, more preferably about 0.5 to 5% by weight, in each case based on the weight of the dry cellulose. It depends on the casing type, on the desired casing properties and optionally on the amount of secondary plasticizer, which can be additionally contained in the non-fiber-reinforced casing.

The proportion of the homo- and/or copolymer can also be higher in the fiber-reinforced cellulose hydrate casings. Here it is about 0.1 to 100% by weight, preferably about 1 to 50% by weight, more preferably about 2 to 30% by weight, based on the weight of the dry cellulose. Surprisingly, the casing properties are so greatly improved by the incorporation of the homo- and/or copolymer that the addition of glycerol can be completely dispensed with.

The addition of homo- and/or copolymers, according to the present invention, markedly increases the water absorption capacity of the material, measured as water imbibition. In Table 1, the dependence of the water imbibition of a tubular fiber-reinforced cellulose casing (caliber 60 mm) on the copolymer content is shown.

TABLE 1

| Copolymer content (% by weight) | Water imbibition (%) | |
| --- | --- | --- |
| | 20% by weight of glycerol | Without glycerol addition |
| 0 | 120–130 | 70–90 |
| 5 | 130–140 | 100–110 |
| 10 | 140–160 | 110–120 |

TABLE 1-continued

| Copolymer content (% by weight) | Water imbibition (%) | |
|---|---|---|
| | 20% by weight of glycerol | Without glycerol addition |
| 15 | 160–190 | 120–130 |
| 18 | 190–200 | 130–140 |

As can be seen from Table 1, with a copolymer content of 10 to 15% (without addition of glycerol), roughly the water imbibition of the conventional cellulose material having a glycerol content of 20% by weight, based on the dry cellulose, is achieved.

Surprisingly, the incorporation of the polymer simultaneously improves the permeation of the fiber-reinforced casings, in addition to the water imbibition, i.e., the water absorption capacity of the casing. However, this improvement does not impair the mechanical strength of the material. As a result, it is possible to incorporate the copolymers even in relatively large amounts to reduce the permeation to a considerably greater extent than with alginate-modified casings. Table 2 shows a comparison of the permeation of differently modified cellulose hydrate casings and collagen fiber casings. It is preferred to add the homo-and/or copolymer in an amount to provide a permeation of no more than 70 $1/m^2d$.

TABLE 2

Permeation of differently modified fiber casings

| Cellulose hydrate % by weight | Alginate % by weight | Glycerol % by weight | Polymer % by weight | Permeation $lm^{-2} \cdot d^{-1}$ |
|---|---|---|---|---|
| 85 | 5 | 10 | — | 100–130 |
| 95 | 5 | — | — | 60–70 |
| 80 | — | — | 20 | 40 |
| Collagen fiber casing | — | — | — | 10–12 |

The casings according to the present invention thus resemble collagen casings more than cellulose hydrate-based casings which are modified by alginate alone. In the ripening of raw sausage during the critical ripening phase of the first days, the casing, because of its relatively high moisture content and due to the low permeation, is able to substantially compensate for varying ripening conditions. The costs of maintaining the ripening conditions can be substantially decreased. As is the case with collagen casings, the cellulose hydrate-based casing according to the invention seldom separates from the sausage meat during storage of the sausage, if the sausage shrinks due to drying. As a result, gaps are prevented from forming between the casing and the dried sausage mass which imparts a folded appearance to the casing.

In addition, the fiber-reinforced cellulose hydrate casing according to the invention features a delayed release of water. In Table 3, the corresponding values for the moisture release of a 10% by weight copolymer-containing fiber casing at 55% relative air humidity and 23° C. are compared with those of a fiber casing without addition of the copolymer.

TABLE 3

Moisture release in %

| Time h | 90% by weight cellulose hydrate 10% by weight copolymer | 100% by weight cellulose hydrate |
|---|---|---|
| 0.5 | 14.3 | 18.0 |
| 1.0 | 22.7 | 25.9 |
| 2.0 | 38.0 | 40.0 |
| 3.0 | 45.0 | 45.3 |

As a result, the casing remains pliable even after processing and after relatively long sausage storage times. The casing is not susceptible to impact and does not tear as easily as conventional casings on incision. Furthermore, the delayed water release has a positive effect on the drying of the cellulose hydrate tube during its production. The drying is moderated and overdrying is avoided.

If required, the fiber-reinforced casings can additionally contain alginic acid and/or alginate. Alginic acids, as is known, are generally carboxyl group-containing plant polysaccharides. Alginates are the salts of alginic acids, preferably the alkali metal, such as ammonium and alkaline earth metal salts. Alginic acid is conventionally isolated as a sodium alginate solution by extraction of brown algae with the aid of soda solution. Alginates or alginic acids comprise 1,4-beta-glycosidically linked D-mannuronic acid units with inclusion of 1,4-alpha-glycosidically linked L-guluronic acid units. They are built up similarly to cellulose from long unbranched chain molecules. The large number of carboxyl groups makes the alginates or alginic acids extremely hydrophilic and gives them the ability to bind 200 to 300 times their weight of water.

Cellulose casings containing alginic acid and/or alginate are known per se and are described in EP-A-0 460 348 which reference is hereby incorporated in its entirety. The combination of alginic acid and/or alginate with the homo-and/or copolymer of the present invention offers surprising advantages for fiber-reinforced casings. In particular the casing properties are still further altered to have the advantageous properties of the collagen casings. The casings have a still lower permeation and are tough, pliable and firm in the desired manner. However, they do not have the paperlike creasing character as is otherwise present in casings only containing alginate, in particular at low moisture contents.

The proportion of alginic acid or of alginate in the film can lie within wide ranges and is generally about 1 to 50% by weight, preferably about 1 to 30% by weight, in particular about 5 to 20% by weight, based on the weight of the dry cellulose. The content of the above-mentioned homo- and/or copolymer in the alginic acid- or alginate-containing films is typically between about 0.1 and 60% by weight, preferably about 0.1 and 10% by weight, based on the weight of the dry cellulose. Even small amounts of about 0.1 to 2% by weight of the homo- and/or copolymer of the present invention, in combination with alginic acid and/or alginate, have a favorable effect, in particular on the permeation, the water imbibition and the drying behavior. For example, the permeation of a fiber-reinforced cellulose hydrate casing containing about 5% by weight of alginic acid and about 0.5 to 2% by weight of homo- and/or copolymer is between about 50 and 60 $1/m^2d$, the water imbibition is about 130 to 140%, the bursting pressure is about 10% above the conventional values and, on drying, embrittlement of the material no longer occurs. This casing, in comparison with one modified only with alginate, is substantially more pliable, tougher and firmer. At higher contents of alginic acid and/or alginate and the above-mentioned homo- and/or copolymer, for example, of about 10% by weight of alginate and about 10% by weight of homo-and/or copolymer, the permeation further decreases to about 30 to 35 $1/m^2d$ the water imbibition is about 140 to 150% and the mechanical strengths of the casing are completely retained. The above data in % by weight are based on the weight of dry cellulose hydrate.

In a further embodiment of the invention, cellulose hydrate casings without fiber reinforcement are modified by the addition of the above-mentioned homo- and/or copolymer of the present invention. They can, moreover, contain a secondary plasticizer such as glycerol, in which case the content thereof can generally be decreased in comparison with unmodified cellulose hydrate casings without fiber reinforcement. The glycerol content is generally in the range of about 8 to 12% by weight, preferably about 10 to 11% by weight.

In the case of these unreinforced cellulose hydrate casings, the incorporated homo- and/or copolymer also improves the water imbibition and the moisture release. The improved permeation, on the other hand, plays a subsidiary role in this casing type, since this type, as so-called "small" casings, is generally not used for naturally ripened or mold-ripened raw sausages.

The improved moisture balance of the cellulose casing generally makes it possible, for example by the incorporation of only about 0.5 to 2% by weight of homo-and/or copolymer to halve the conventional glycerol content from about 20 to 22% by weight to about 10 to 11% by weight. At higher concentrations, in particular from about 5% by weight, the secondary plasticizer can be dispensed with, even in the case of casing types without fiber reinforcement.

The non-fiber-reinforced casings according to the present invention can be both glycerol-free and are very pliable, even with reduced glycerol content, and they can be dried without problem, without a disadvantageous embrittlement or overdrying occurring.

The reduction of the amounts of glycerol to be used in sausage casing production is also extremely advantageous with respect to the glycerol-related emission problems in the production and the migration problems in the processing.

Furthermore, the pure cellulose hydrate casings are surprisingly improved with respect to their mechanical properties. This result is particularly astonishing according to the experience collected with alginic acid and/or alginate as substitute for secondary plasticizers in casings without fiber reinforcement. Alginic acid loosens the structure of the cellulose hydrate and in this manner counteracts the crystallization process described at the outset. As a result, the water imbibition and the casing pliability are significantly improved. However, at the same time, the structural loosening due to the alginate causes an impairment of the mechanical strength such that alginate-containing casings cannot be handled without fiber reinforcement. Surprisingly, the incorporation of the polymers into the cellulose hydrate casing according to the present invention enhances the water imbibition and the moisture balance, while at the same time surprisingly improving the mechanical properties. This is shown, e.g., in an improved bursting pressure which is about 8 to 10% above the desired value of the standard material and the variations in caliber are substantially lower.

As a sausage casing, the film is typically used in the conventional caliber of about 18 to 200, in particular about 40 to 135 mm. However, any caliber casing may be used. The fiber-reinforced film, in the preferred caliber range of about 40 to 135 mm, usually has a weight per unit area of 85 to 120 g/m$^2$. The unreinforced film is preferably used in the caliber range of about 30 to 50 with a weight per unit area of about 40 to 60 g/m$^2$. However, any caliber casing may be used. When the secondary plasticizers such as glycerol are additionally added, if desired, the weight per unit area increases accordingly, depending on the amount of plasticizer.

The casing is generally stored in sections or rolls having a water content of about 10 to 30% by weight. The water content of the so-called "sticks" casings is generally about 14 to 20% by weight. For the so-called "sticks" casings not requiring water-soaking, the water content is increased to about 23 to 30% by weight. All the above data in % by weight are based on the total weight of the casing.

The present invention furthermore relates to a process for producing the film. The production of the film is carried out in a manner known per se by the viscose process. The homo- and/or copolymer(s) and, if required, the alginic acid or the alginate, in aqueous solution in its/their water-soluble form as sodium salt is/are homogeneously mixed with the alkaline viscose solution in the desired weight ratio, that is generally either in the spinning tank or shortly before the spinning die. The mixture of the viscose and homo-and/or copolymer is extruded in the form of a web or tube through a spinning die, although any known method of forming a film can be used. In the production of films having a fiber reinforcement, a fiber web known per se, which if required is rolled to form a tube, is impregnated and coated with the mixture of conventional alkaline viscose solution and homo- and/or copolymers. Coating and impregnating are broadly defined as applying the solution to the fibrous web, and the solution generally remaining on the surface of the web or fibers, and/or penetrating into the fibers of the web.

By the action of an acidic spinning liquid which conventionally contains sulfuric acid, the viscose is then precipitated out. The precipitating liquid is situated, for example, in a bath, through which runs the extruded viscose solution or the viscose-treated fiber web, if required rolled in a tubular shape. The precipitating liquid can also be applied as a film to the extruded viscose or to the viscose-treated fiber web through a die. However, any known process may be used to impregnate or coat the fiber web. After running through the regeneration and wash baths conventional in the production of cellulose hydrate films, the film is dried. For drying to the conventional moisture content (about 8 to 10% for cellulose casings), a higher energy expenditure is generally required, because of the high water binding capacity of the casing according to the present invention.

Before drying, the film, if required, is conducted through a bath containing a secondary plasticizer, such as an aqueous glycerol solution. The addition of a plasticizer is advantageous in the case of casings without fiber reinforcement. From a homo- or copolymer content of about 5% by weight, the film already has the pliability required for processing, so that addition of glycerol is no longer necessary.

If the film according to the invention is used as a food casing, in particular as a sausage casing, it can be coated, if required, on the inside and/or outside of the casing. This coating can be a barrier layer against atmospheric oxygen and water vapor. An internal coating contributes to improving the peelability and/or to improving the adhesion between sausage mass and the casing interior wall. The casing can also have a fungicidal outer coating. If required, it contains conventional pigments, e.g., soot or $TiO_2$. As a tubular packaging casing, it is marketed, for example, in shirred form, as a section tied off at one end or in flattened form as a roll.

The invention is described in more detail by the following examples. Unless otherwise stated, all percentages are by weight.

EXAMPLE 1

Hemp fiber paper (weight per unit area 17 g/m$^2$) is formed into a tube (caliber 55 mm). In a continuous process, the tube interior and exterior are impregnated and coated with a mixture of 172 l/h of alkaline viscose solution and 24.8 l/h of a 10% strength aqueous solution of a copolymer with units of the formula I and III, in which n=1, m=2, Z=O, $R^2$ and $R^3$ $CH_3$, $R^4$ $C_2H_5$ and X=$C_2H_5$-O-$SO_2$-$O^-$. The copolymer is available under the trade name Gafquat® 755N from GAF Chem. Corp. It is a quaternized copolymer of N-vinylpyrrolidone and ethyl-(2-methacryloyloxyethyl)dimethylammonium ethyl sulfate. The viscose-treated tube is conducted through the conventional precipitation, regeneration and wash baths. The plasticizer bath conventional for cellulose tubes is dispensed with. The glycerol-free gel tube is inflated with supporting air and is dried to a moisture content of 12 to 14%, based on the total weight of the tube. The finished product contains 20% by weight of the copolymer, based on the weight of the dry cellulose.

EXAMPLE 2

Hemp fiber paper (weight per unit area 17 g/m$^2$) is formed into a tube (caliber 65 mm). The tube exterior is coated and impregnated with a mixture of 151 l/h alkaline viscose and 19 l/h of a mixture of 13.6 l/h of a 4% strength sodium alginate solution and 5.4 l/h of a 10% strength copolymer solution of Example 1. The viscose-treated tube is treated with acid precipitation liquid and conducted through the conventional regeneration baths. Before entry into the dryer, it is provided on its inside with an adhesive impregnation. The tube inflated with supporting air is dried to a moisture content of 12 to 14%, based on the total weight of the tube. The action of heat hardens the casein/glyoxal and it transforms into its water-insoluble form. A plasticizer treatment is not provided. The finished product contains 5% by weight of copolymer and 5% by weight of alginate, each based on the weight of the dry cellulose.

EXAMPLE 3

A mixture of 111.7 l/h of alkaline viscose and 8.04 l/h of a 10% strength copolymer solution of Example 1 is extruded through a narrow casing die having a diameter of 40 mm into an acidic precipitation liquid of conventional composition and is then conducted through the conventional baths for regeneration of the cellulose and wash baths. The conventional plasticizer bath is dispensed with. In the dryer, the gel tube is inflated and dried to a moisture content of 10 to 12% by weight, based on the total weight of the tube. The finished product has a copolymer content of 10% by weight, based on the weight of the dry cellulose.

The very stable and pliable material can be wound up, mechanically tied off and shirred without problem. The variations in caliber occurring are substantially lower than with glycerol-containing standard material.

EXAMPLE 4

A mixture of 117 l/h of alkaline viscose and 1.68 l/h of a 5% strength copolymer solution of Example 1 is extruded through a narrow casing die having a diameter of 40 mm into an acidic precipitation liquid of conventional composition and then conducted through the conventional baths for the regeneration of cellulose, wash baths and a plasticizer bath. In the dryer, the gel tube is inflated and dried to a moisture content of 10 to 12% by weight, based on the total weight of the tube. The finished product has a glycerol content of 10 to 11% by weight and a copolymer content of 1% by weight, each based on the weight of the dry cellulose.

The very stable and pliable material can be wound up, mechanically tied off and shirred without problem. The variations in caliber occurring are significantly lower than with glycerol-containing standard material.

The properties of the casings according to the examples and comparative examples are summarized in Table 4 below:

TABLE 4

| Examples | Weight per unit area g/m$^2$ | Bursting pressure kPa (Desired value) | Water imbibition % | Permeation l/m$^2$d | Static extension mm (Tolerance) |
|---|---|---|---|---|---|
| 1 FC | 80 | 120 | 130 | 38 | 55.8 |
| C 50 |  | (105) |  |  | (54.4–56.4) |
| 2 FC | 76 | 71 | 140 | 50 | 70.5 |
| C 65 |  | (66.3) |  |  | (68.1–71.1) |
| 3 CC | 42 | 37 | 101 | 60 | 45 |
| C 40 |  | (30) |  |  | (43–47) |
| 4 CC | 48 | 34 | 120 | 75 | 44.5 |
| C 40 |  | (30) |  |  | (43–47) |

FC = Fiber-reinforced casing (fibrous casing)
CC = Casing without fiber reinforcement (cellulose casing)
C = Caliber Other embodiments of the invention will be apparent to those skilled in the art from consideration of the specification and practice of the invention disclosed herein. It is intended that the specification be considered as exemplary only, with the true scope and spirit of the invention indicated by the following claims.

What is claimed is:

1. A cellulose hydrate film, comprising cellulose hydrate and a polymer selected from the group consisting of a homopolymer of repeating units of the formula I, a copolymer of repeating units of the formulae I and II, and a copolymer of repeating units of the formulae I and III, and a mixture thereof, wherein

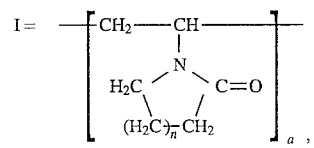

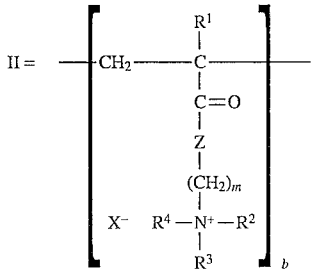

-continued

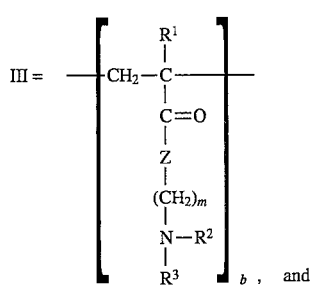

in which
n=1, 2 or 3,
m=2, 3, 4, 5 or 6,
a=about 20 to 100 mol %,
b=about 80 to 20 mol % and
a+b=100 mol %,
$R^1$ is H or a ($C_1$–$C_6$)-alkyl radical,
$R^2$ to $R^4$ are identical or different and are ($C_1$–$C_6$)alkyl radicals,
Z=O or N-$R^5$, in which $R^5$=H or ($C_1$–$C_6$)-alkyl radicals and
X=Cl$^-$, Br$^-$, I$^-$, F$^-$, 1/2SO$_4^{2-}$, HSO$_4^-$, ($C_1$–$C_6$)-alkyl-O-SO$_2$-O$^-$, ($C_1$–$C_6$)-alkyl-SO$_2$-O$^-$.

2. A film as claimed in claim 1, wherein said polymer is selected from the group consisting of a copolymer of repeating units of the formulae I and II and a copolymer of repeating units of the formulae I and III, and a mixture thereof, wherein
n=1,
m=2, 3 or 4,
a=about 30 to 70 mol % and
b=about 70 to 30 mol % and
a+b=100 mol %,
Z=O or NH,
X$^-$=HSO$_4^-$, ($C_1$–$C_6$)-alkyl-O-SO$_2$-O$^-$ or ($C_1$–$C_6$)-alkyl-SO$_2$ -O$^-$ and
$R^1$ is H or CH$_3$,
$R^2$ to $R^4$ are identical or different and are CH$_3$ or C$_2$H$_5$.

3. A film as claimed in claim 1, wherein said film is flat.
4. A film as claimed in claim 1, wherein said film is tubular.
5. A film as claimed in claim 1, wherein the polymer has a mean molecular weight $M_w$ of about 50,000 to 2,000,000.
6. A film as claimed in claim 5, wherein said mean molecular weight $M_w$ is about 500,000 to 1,500,000.
7. A film as claimed in claim 1, wherein the polymer is present in said film in an amount of about 0.1 to 60% by weight based on the weight of dry cellulose hydrate.
8. A film as claimed in claim 1, wherein the film additionally comprises at least one of alginic acid and alginate.
9. A film as claimed in claim 8, wherein the at least one of alginic acid and alginate is present in an amount of about 1 to 50% by weight, based on the weight of dry cellulose hydrate.
10. A film as claimed in claim 1, wherein the film further comprises a fiber reinforcement.
11. A film as claimed in claim 1, wherein said film contains no fiber reinforcement.
12. A film as claimed in claim 1, wherein said film has a moisture content of about 10 to 30% by weight, based on the total weight of the cellulose hydrate film.

13. A film as claimed in claim 1, wherein said film has a permeation of ≦70 l/m$^2$d.
14. A film as claimed in claim 1, wherein said film is configured as a sausage casing.
15. A cellulose hydrate film, comprising
cellulose hydrate and a polymer selected from the group consisting of
a homopolymer of repeating units of the formula I,
a copolymer of repeating units of the formulae I and II, and
a copolymer of repeating units of the formulae I and III, and a mixture thereof, wherein

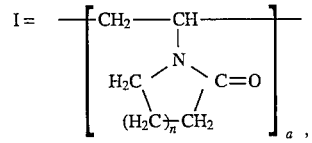

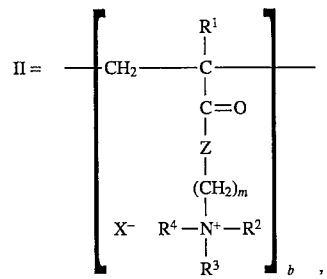

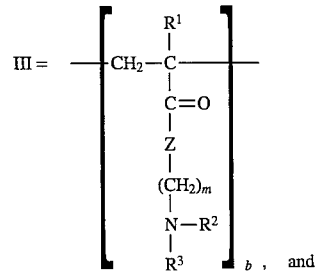

in which
n=1, 2 or 3,
m=2, 3, 4, 5 or 6,
a=about 20 to 100 mol %,
b=about 80 to 20 mol % and
a+b=100 mol %,
$R^1$ is H or a ($C_1$–$C_6$)-alkyl radical,
$R^2$ to $R^4$ are identical or different and are ($C_1$–$C_6$)alkyl radicals,
Z=O or N-$R^5$, in which $R^5$=H or ($C_1$–$C_6$)-alkyl radicals and
x=Cl$^-$, Br$^-$, I$^-$, F$^-$, 1/2SO$_4^{2-}$, HSO$_4^-$, ($C_1$–$C_6$)-alkyl-O-SO$_2$-O$^-$, ($C_1$–$C_6$)-alkyl-SO$_2$-O$^-$,
wherein said film is made by a process comprising:
preparing a solution of an alkaline viscose solution which comprises an aqueous solution of said polymer;
extruding the alkaline viscose solution into the shape of a film; and
coagulating said viscose film by an acidic precipitation liquid to form said film.

16. A film as claimed in claim 15, wherein the polymer has a mean molecular weight of about 50,000 to 2,000,000.
17. A film as claimed in claim 15, wherein the polymer has a mean molecular weight of about 500,000 to 1,500,000.

18. A fiber reinforced cellulose hydrate film, comprising cellulose hydrate, a fiber reinforcement and a polymer selected from the group consisting of a homopolymer of repeating units of the formula I, a copolymer of repeating units of the formulae I and II, and a copolymer of repeating units of the formulae I and III, and a mixture thereof, wherein

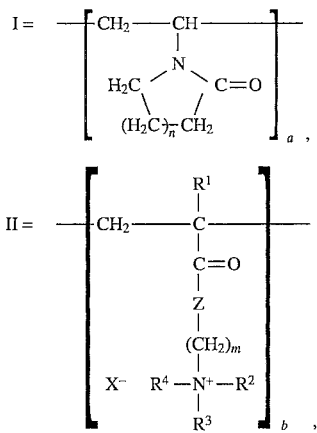

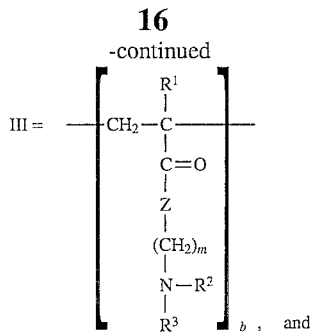

in which n=1, 2 or 3, m=2, 3, 4, 5 or 6, a=about 20 to 100 mol %, b=about 80 to 20 mol % and a+b=100 mol %, $R^1$ is H or a $(C_1-C_6)$-alkyl radical, $R^2$ to $R^4$ are identical or different and are $(C_1-C_6)$alkyl radicals, Z=O or N-$R^5$, in which $R^5$=H or $(C_1-C_6)$-alkyl radicals and X=$Cl^-$, $Br^-$, $I^-$, $F^-$, $1/2SO_4^{2-}$, $HSO_4^-$, $(C_1-C_6)$-alkyl-O-$SO_2$-$O^-$, $(C_1-C_6)$-alkyl-$SO_2$-$O^-$, wherein said film is made by a process comprising:

preparing a solution of an alkaline viscose solution which comprises an aqueous solution of said polymer;

extruding the alkaline viscose solution into the shape of a film; and coagulating said viscose film by an acidic precipitation liquid to form said fiber reinforced film.

* * * * *